United States Patent
Froeschle et al.

(10) Patent No.: US 9,783,031 B2
(45) Date of Patent: Oct. 10, 2017

(54) ROOF SYSTEM FOR A CABRIOLET MOTOR VEHICLE

(71) Applicant: Dr. Ing. h.c. F. Porsche Aktiengesellschaft, Stuttgart (DE)

(72) Inventors: Mathias Froeschle, Ostfildern (DE); Dietmar Stukowski, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/955,356

(22) Filed: Dec. 1, 2015

(65) Prior Publication Data
US 2016/0167497 A1    Jun. 16, 2016

(30) Foreign Application Priority Data

Dec. 10, 2014 (DE) .................. 10 2014 118 337

(51) Int. Cl.
*B60J 7/20* (2006.01)
*B62D 25/04* (2006.01)
*B60J 7/14* (2006.01)
*B60J 7/12* (2006.01)

(52) U.S. Cl.
CPC ............. *B60J 7/20* (2013.01); *B60J 7/1265* (2013.01); *B60J 7/148* (2013.01); *B60J 7/203* (2013.01); *B62D 25/04* (2013.01)

(58) Field of Classification Search
CPC ... B60J 7/20; B60J 7/148; B60J 7/1265; B60J 7/203; B62D 25/04
See application file for complete search history.

(56) References Cited

U.S. PATENT DOCUMENTS 6,322,131 B1   11/2001   Maass et al.
6,540,280 B2    4/2003   Tamura et al.
(Continued)

FOREIGN PATENT DOCUMENTS

DE         199 12 355      12/2000
DE      10 2006 007 362     8/2007
(Continued)

OTHER PUBLICATIONS

German Search Report of Jul. 22, 2015.
English Translation of Korean Office Action.

*Primary Examiner* — Glenn Dayoan
*Assistant Examiner* — Melissa A Black
(74) *Attorney, Agent, or Firm* — Gerald E. Hespos; Michael J. Porco; Matthew T. Hespos

(57) ABSTRACT

A roof system (12) for a cabriolet vehicle (10) has a folding top (14) that is movable between a deployed position and a retracted position covered by a folding-top compartment lid (18). A side fin (16) is movable from a use position, in which the side fin (16) forms a rearward elongation of a support pillar (22), into a pivoted-away position, in which the side fin (16) is swiveled away from the folding-top compartment lid (18) about a swivel axis and into a pivoted-in position in which the side fin (16) is below the folding-top compartment lid (18). Movement of the side fin (16) away from the folding-top compartment lid (18) enables the side fin (16) to be positioned closer to or in the range of movement of the folding top (14) and the folding-top compartment lid (18) during movement between the deployed and retracted positions.

15 Claims, 8 Drawing Sheets

(56) References Cited

U.S. PATENT DOCUMENTS

| | | | |
|---|---|---|---|
| 7,740,302 B2* | 6/2010 | Heselhaus | B60J 7/1265 296/107.01 |
| 2003/0011208 A1 | 1/2003 | Tamura et al. | |
| 2004/0066057 A1* | 4/2004 | Quindt | B60J 1/1823 296/107.08 |
| 2007/0194594 A1 | 8/2007 | Heselhaus | |
| 2011/0291438 A1* | 12/2011 | Schulz | B60J 7/203 296/107.08 |

FOREIGN PATENT DOCUMENTS

| | | |
|---|---|---|
| DE | 10 2008 062 271 | 6/2010 |
| DE | 20 2013 102 167 | 6/2013 |
| JP | 3155375 B2 | 4/2001 |
| JP | 3524524 B2 | 5/2004 |

* cited by examiner

ROOF SYSTEM FOR A CABRIOLET MOTOR VEHICLE

CROSS REFERENCE TO RELATED APPLICATION

This application claims priority under 35 USC 119 to German Patent Appl. No. 10 2014 118 337.1 filed on Dec. 10, 2014, the entire disclosure of which is incorporated herein by reference.

BACKGROUND

1. Field of the Invention

The invention relates to a roof system for a cabriolet motor vehicle, by means of which a folding top can be deployed selectively to cover vehicle occupants and retracted for open-top driving without a cover.

2. Description of the Related Art

DE 10 2008 062 271 A1 discloses a cabriolet motor vehicle having a roof system with vertically running side fins that run laterally with respect to a folding-top compartment lid. The side fins can be pivoted over onto a folding top of the roof system after the folding top has been retracted past the side fins. Thus, the folding-top compartment lid, in the closed position, covers both the folding top and the pivoted-over side fins.

There is a constant demand to design the roof system for a cabriolet motor vehicle to take up the least possible structural space and so as not to adversely affect the visual appearance of the cabriolet motor vehicle.

It is an object of the invention to provide a structural space-saving roof system for a cabriolet motor vehicle that gives a good visual appearance of the cabriolet motor vehicle.

SUMMARY

The invention relates to a roof system for a cabriolet motor vehicle. The roof system includes a folding top that is movable between a deployed position and a retracted position. The roof system also has a folding-top compartment lid for covering the folding top in the retracted position of the folding top. The roof system further has a side fin that forms a rearward elongation of a support pillar (B pillar or C pillar) in the deployed position of the folding top. The side fin is movable between a use position, a pivoted-away position and a pivoted-in position. The side fin that is in the use position forms the rearward elongation of the support pillar. The side fin that is in the pivoted-away position is swiveled away from the folding-top compartment lid about a swivel axis. The side fin that is in the pivoted-in position is arranged vertically below the folding-top compartment lid.

The roof system has right and left side fins that are mirror-symmetrical and improve the aerodynamics of the cabriolet motor vehicle in the deployed position of the folding top. The side fins can be swiveled away from the folding-top compartment lid into the pivoted-away position. Thus, it is not necessary for the side fin to be positioned entirely outside the range of movement of either the folding top or of the folding-top compartment lid during the movement between the deployed position and the retracted position. More particularly, the side fins can be positioned closer to the central axis of the cabriolet motor vehicle so that the aerodynamics of the cabriolet motor vehicle can be improved. At the same time, it is possible for the side fin to be inward of a side wall of a motor vehicle body so that a joint between the folding-top compartment lid and a part of the side wall pointing substantially horizontally to the side can be avoided. In this way, the visual appearance of the cabriolet motor vehicle is not affected adversely by a joint in the side wall. Furthermore, the folding-top compartment lid does not need a bent-over side edge that can be integrated in the side wall. Thus, the shaping and the movement kinematics of the folding-top compartment lid during the movement of the folding top between the retracted position and the deployed position can be simplified. The ability of the side fin to be swiveled away from the folding-top compartment lid enables the side fin to be closer to or even in the range of movement of the folding top and/or of the folding-top compartment lid during the movement between the deployed position and the retracted position. Therefore, an arrangement of the side fin in a joint in a side wall of the motor vehicle body is avoided to achieve a structural space-saving roof system that gives a good visual appearance of the cabriolet motor vehicle.

The folding-top compartment lid that is in a closed position can close the opening of a folding-top compartment in a rear-end region of the motor vehicle. In particular, the open folding-top compartment lid can be displaced relative to the folding-top compartment in a vertical direction and/or can be swiveled about a horizontal axis running transverse to the direction of travel. If appropriate, the folding-top compartment lid also may be displaced in a horizontal direction along the direction of travel. The folding-top compartment lid may exhibit suitable movement kinematics via articulated connected link levers and/or rail guides connected to the folding-top compartment and/or the motor vehicle body. The folding top and the side fin can be moved past the open folding-top compartment lid into the folding-top compartment. The folding top may be a soft top or a hard top, and may have multiple parts forming that can be arranged one above the other in space-saving fashion during movement from the deployed position into the retracted position. This movement may be carried out with a suitable link lever arrangement. An opening for a linkage of the link lever arrangement for the folding top may be provided between the folding-top compartment lid and the rest of the motor vehicle body. The opening can be closed by a separate linkage flap in the retracted position of the folding top. A front edge of the side fin may extend as far as an upper edge of the support pillar. The upper edge is at the top as viewed in the direction of gravitational force. In this way, the side fin can extend up to the height of the folding top in the deployed position.

The side fin that is in the pivoted-in position may be arranged vertically between the folding-top compartment lid and the folding top that is in the retracted position. Alternatively, the side fin that is in the pivoted-in position may be arranged transversely with respect to the direction of travel, and laterally adjacent to the folding top that is in the retracted position. Depending on the available structural space for the folding-top compartment, it is possible for the side fin to be displaced and/or swiveled into the folding-top compartment substantially in a vertical direction, and to be situated adjacent to the folding top in a horizontal direction in the retracted position of the folding top. In this way, the vertical dimension of the folding-top compartment can be reduced. The side fin also can be pivoted laterally into the folding-top compartment and into a position vertically above or below the folding top that is in the retracted position. In this way, structural space can be saved in a horizontal direction for the folding-top compartment.

The side fin may be swiveled through an angle α between the use position and the pivoted-in position, wherein α=0°±30°, in particular α=0°±15°, preferably α=0°±10° or α=90°±30°, in particular α=90°±15°, preferably α=90°±10° or α=180°±30°, in particular α=180°±15°, preferably α=180°±10° or α=270°±30°, in particular α=270°±15°, preferably α=270°±10°. For example, the side fin may be swiveled out of the movement path of the folding-top compartment lid and/or of the folding top through a comparatively small angle and may be positioned in the folding-top compartment by vertical movement. For this purpose, the side fin may be connected to a bracket that can displace and/or swivel vertically. Thus, the side fin can swivel into the pivoted-away position and out of the movement path of the folding-top compartment lid that is being opened. The side fin then can be swiveled back below the folding-top compartment lid and lowered into the folding-top compartment after the folding-top compartment lid has been moved past the side fin. If appropriate, the side fin that is in the pivoted-in position and within the folding-top compartment can swivel away from a central line of the motor vehicle and/or can be displaced laterally into a region laterally adjacent to the folding top that is in the retracted position, and in particular below a region of the motor vehicle body. The side fin that is in the pivoted-in position may be pivoted over laterally. For this purpose, the side fin may be connected to the motor vehicle body and initially may be swiveled out of the movement path of the folding top and/or the folding-top compartment lid into the pivoted-away position. The side fin then may be pivoted into the folding-top compartment after the folding top has assumed the retracted position, and the folding-top compartment lid then can close the folding-top compartment. The side fin can be pivoted substantially vertically rather than horizontally into the folding-top compartment. For this purpose, the side fin may be connected to the motor vehicle body and initially may be swiveled out of the movement path of the folding top and/or of the folding-top compartment lid into the pivoted-away position. The side fin then may be pivoted through approximately 180° and into the folding-top compartment after the folding-top compartment lid has opened and before the folding top has assumed the retracted position. The side fin also can be connected to the folding-top compartment lid. In this case, the side fin initially may be pivoted laterally out into the pivoted-away position so that the side fin does not strike the folding top during the opening movement of the folding-top compartment lid. When the folding-top compartment lid has been deployed to an adequate extent (e.g. approximately 270°), the side fin is swiveled to the underside of the folding-top compartment lid. Thus, the side fin automatically is positioned in the pivoted-in position between the folding-top compartment lid and the folding top in the retracted position in the closed position of the folding-top compartment lid.

The side fin that is in the use position may project transverse to the direction of travel and may be laterally adjacent to the folding-top compartment lid, and can move into a folding-top compartment. The folding top compartment can receive the folding top in the retracted position and the side fin in the pivoted-in position, and can be closed by the folding-top compartment lid. At least a part of the side fin that is arranged outside the folding-top compartment in the use position can be swiveled away from or toward the folding-top compartment lid about the swivel axis that runs substantially in the direction of travel. A joint may be formed between the folding-top compartment lid and the rest of the vehicle body. The side fin in the use position can be led out from the folding-top compartment through the joint. A seal may be disposed in the folding-top compartment to seal the joint with respect to rainwater. The side fin can be deployed and retracted through the joint. The side fin can be flexible in the region of the joint so that that part of the side fin that is arranged outside the folding-top compartment easily can be tilted to the side without the need for that part of the side fin within the folding-top compartment to move conjointly.

The swivel axis of the side fin may run through a flexible material of the side fin, such as a textile material. The flexible material may be tensioned between a bracket that is below the closed folding-top compartment lid in the direction of gravitational force and that may be a clamping clip. A reinforcement strut, such as a glass-fiber rod may run on the upper edge of the side fin as viewed in the direction of gravitational force. If the folding top is a soft top, the side fin may be composed of the same material, such that the folding top and the side fin visually form a unit. The flexible material makes it possible for the side fin to swivel in a simple manner between the use position and the pivoted-away position and/or the pivoted-in position. The flexible material may be tensioned tightly between the bracket in the folding-top compartment and the reinforcement strut. Thus, an aerodynamically streamlined surface is attained and unnecessary noises in the presence of relative wind are prevented.

Alternatively, the side fins may be hard shells with or without a textile lining, and/or may have hard support elements.

A front end of the side pillar pointing toward the support pillar may be connected to a link lever that is coupled in terms of movement to the folding top and that functions to swivel the side fin. Movement of the side fin between the use position and the pivoted-away position and/or the pivoted-in position can be implemented by the link lever. The link lever is coupled to the folding top with movement kinematics to avoid collisions between the side fin, the folding top and the folding-top compartment lid. The link lever also may be configured to tension a flexible material of the side fin.

The support pillar or an element of the support pillar may be connected to the side fin and may swivel together with the side fin. The support pillar may be covered entirely or partially by the side fin so that at least part of the support pillar can be moved together with the side fin into the folding-top compartment. Furthermore, the side fin may be integrated into the design of the support pillar. The support pillar may be spanned entirely or partially by a flexible material of the side fin so that the support pillar is concealed. The support pillar or the support pillar element may act as a rigid element of the side fin and improve aeroacoustic comfort in the presence of relative wind. Alternatively, the support pillar may be entirely or partially visible so that the support pillar can be a styling element, such as a color offset with respect to the side fin and/or with respect to the folding top. The support pillar may be a polished and/or brushed metal.

The side fin may be collapsed in the pivoted-in position so that various parts of the side fin may be arranged one above the other and/or adjacent to one another. In this way, the side fin can be more compact in the pivoted-in position, and can be positioned more easily in a limited receiving region of the folding-top compartment.

The side fin, in the use position, may partially cover the folding-top compartment lid as viewed in the vertical direction. Thus, the side fin, in the use position, may run oblique to the vertical. In this way, the side fins can more easily follow an aerodynamically more expedient shape of the motor vehicle body and/or of the folding top. The side fin can be into the pivoted-away position during a movement of the folding-top compartment lid so that the side fin is out of the range of movement of the folding-top compartment lid. Hence, there is no risk of collision with the folding-top compartment lid even if the side fin projects over the folding-top compartment lid in the use position.

An outflow opening may be provided between the side fin and the folding-top compartment lid when the side fin is in the use position for discharging rainwater on the folding-top compartment lid. Thus, the folding-top compartment lid can be convex, and rainwater striking the folding-top compartment lid can flow off laterally toward the side fin. The outflow opening prevents a build-up of rainwater on the side fin, and the rainwater can flow off laterally through the outflow opening onto the rest of the motor vehicle body.

An embodiment of the invention will be discussed below with reference to the appended drawings. The features presented below may each individually and in combination constitute an aspect of the invention.

DETAILED DESCRIPTION

Figure 1:
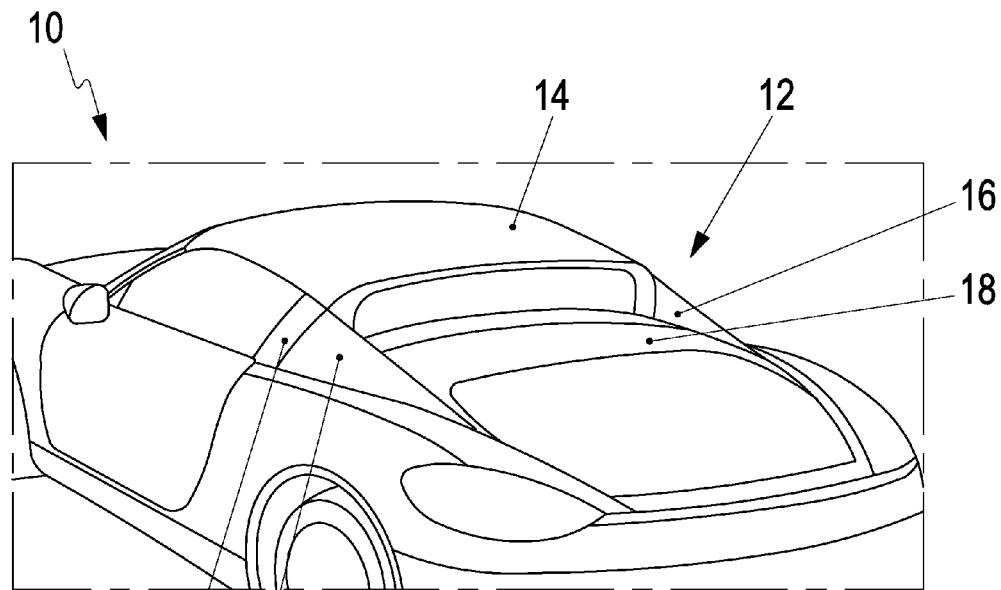
FIG. 1 is a schematic perspective view of a motor vehicle with side fins in a use position.
Figure 2:
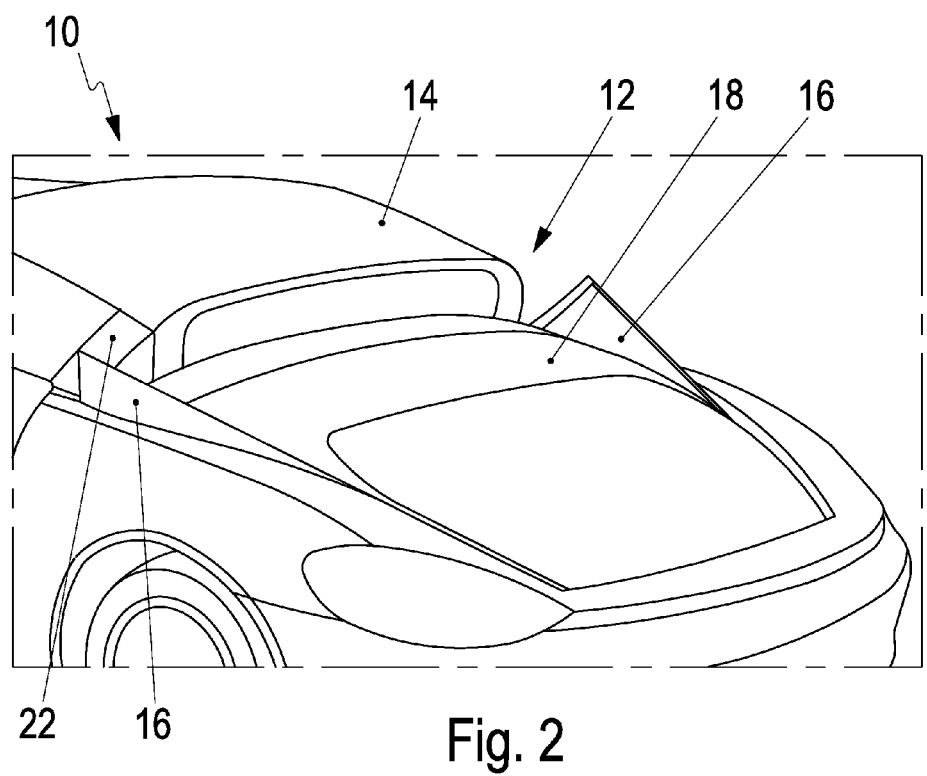
FIG. 2 is a schematic perspective view of the motor vehicle of FIG. 1 with the side fins in a pivoted-away position.

FIG. 1 illustrates a cabriolet motor vehicle 10 with a roof system 12 that has a folding top 14 and side fins 16 that extend to the folding top 14. The folding top 14 and the side fins 16 can be stowed in a folding-top compartment 20 that can be closed off by a folding-top compartment lid 18. The folding top 14 and side fins 16 can be deployed into the deployed position of the folding top 14, as illustrated in FIG. 1. In the illustrated use position, each side fin 16 bears against a support pillar 22. In the illustrated embodiment, the cabriolet motor vehicle 10 is a two-seater, such that the support pillar 22 is the B pillar. If the cabriolet motor vehicle 10 is a four-seater, the support pillar 22 may be the C pillar. In the use position, the side fins 16 may be inclined in the direction of a central axis that runs in the direction of travel of the cabriolet motor vehicle 10 and may partially cover the folding-top compartment lid 18. The side fins 16 can be swiveled away from the central axis into the pivoted-away position illustrated in FIG. 2 so that the folding-top compartment cover 18 can be opened and the folding top 14 can be moved past the side fins 16.

Figure 3:
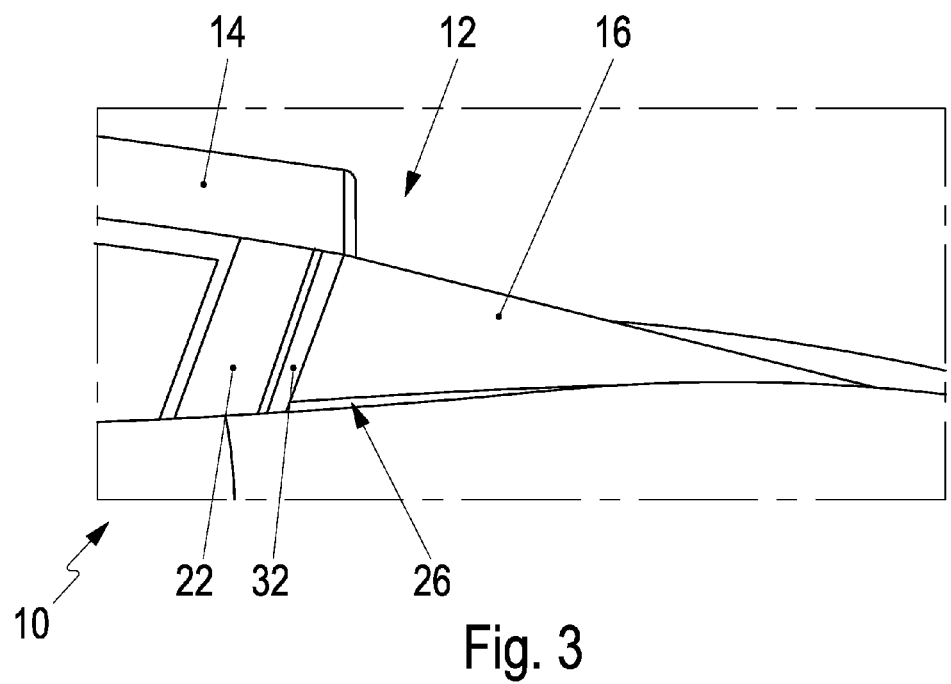
FIG. 3 is a schematic side view from the outside of a side fin of the motor vehicle of FIG. 1.
Figure 4:
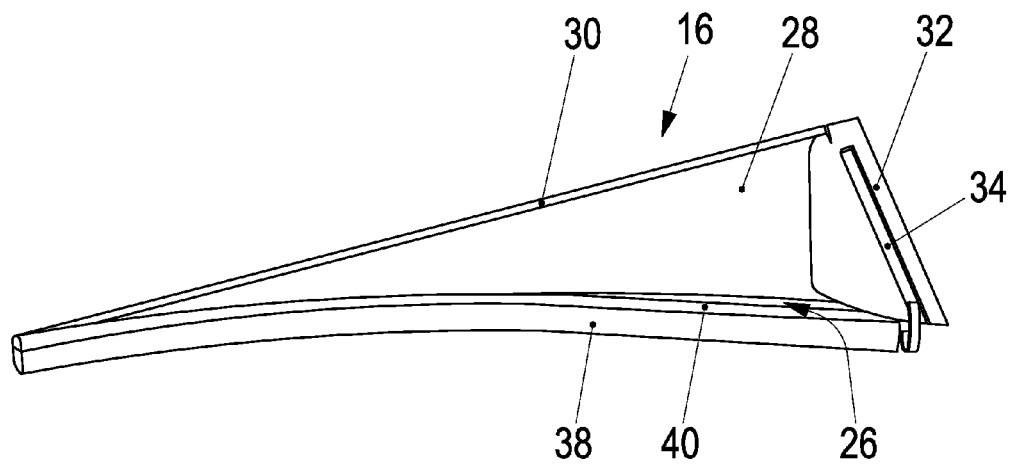
FIG. 4 is a schematic side view, from the inside, of the side fin from FIG. 3.

As illustrated in FIG. 3, an outflow opening 26 may be formed between the side fin 16, the support pillar 22 and a motor vehicle body 24 of the cabriolet motor vehicle 10, and rainwater that lands between the side fins 16 can be discharged laterally through the outflow opening 26. As illustrated in FIG. 4, the side fin 16 may have a flexible material 28, such as a textile, that is connected to an upper reinforcement strut 30, such as a glass-fiber rod. The flexible material 28 and/or the reinforcement strut 30 may be connected to a support pillar element 32 of the support pillar 22. The support pillar element 32 may be connected to a link lever 34. Alternatively, the flexible material 28 and/or the reinforcement strut 30 may be connected directly to the link lever 34. Thus, a support pillar element 32 that can be separated from the rest of the support pillar 22 can be omitted.

Figure 5:
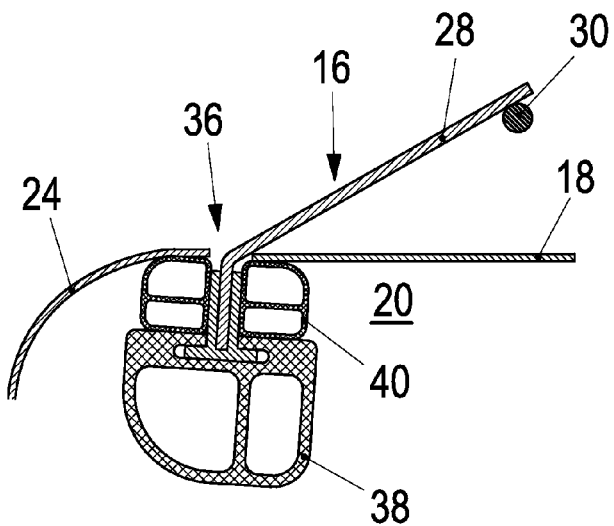
FIG. 5 is a schematic sectional view of the side fin of FIG. 3.

As illustrated in FIG. 5, the side fin 16, with its relatively very thin, flexible material, can project into the folding-top compartment 20 through a correspondingly thin joint 36 between the folding-top compartment cover 18 and the rest of the motor vehicle body 24. The side fin 16 can swivel about a swivel axis running in the joint 36. The part of the flexible material 28 that projects into the folding-top compartment 20 may be tensioned by a bracket 38 that is in the form of a clamping clip so that the flexible material 28 can be pulled flat between the reinforcement strut 30 and the bracket 38. Furthermore, a seal 40 is provided between the bracket 38, at one side, and the folding-top compartment cover 18 and the motor vehicle body 24, at the other side to prevent an ingress of rainwater into the folding-top compartment cover 20.

Figure 6:
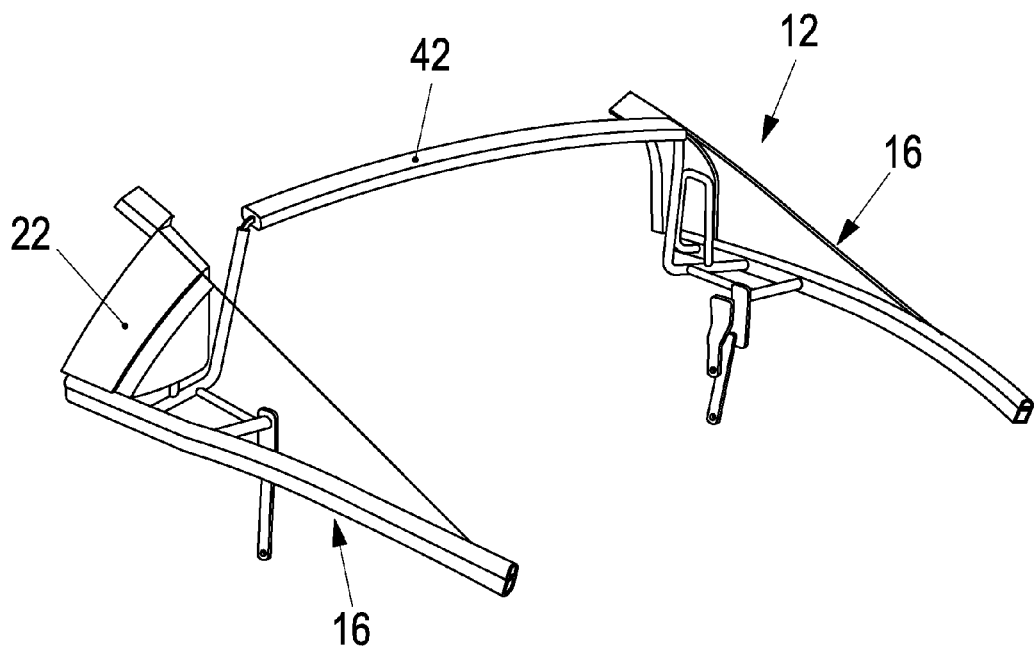
FIG. 6 is a schematic perspective view of a link arrangement for a folding top of the motor vehicle of FIG. 1.
Figure 7:
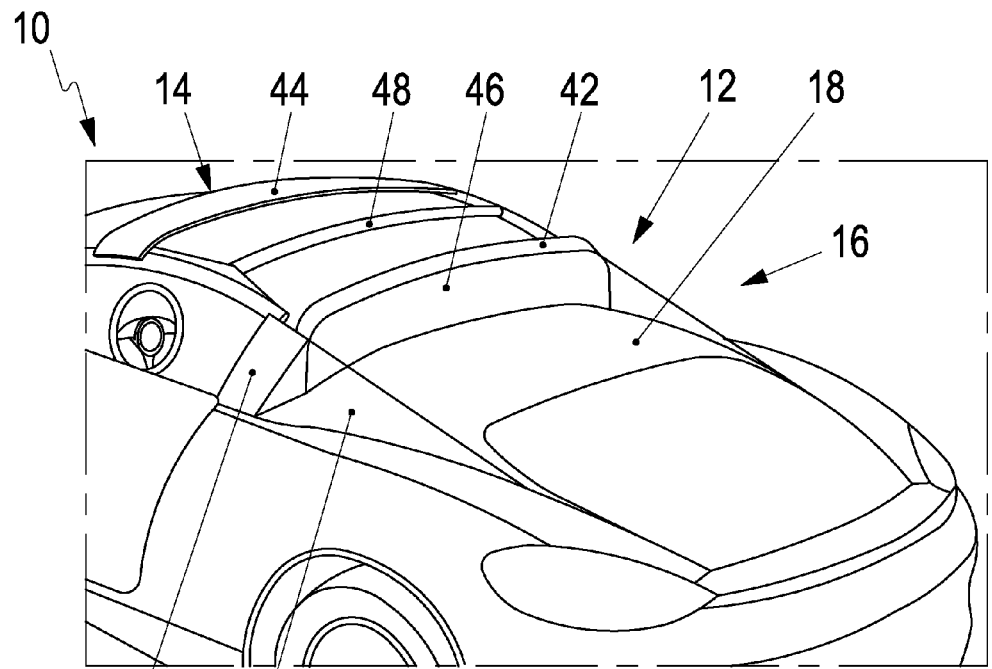
FIG. 7 is a schematic perspective view of the motor vehicle of FIG. 1 in a first position.
Figure 8:
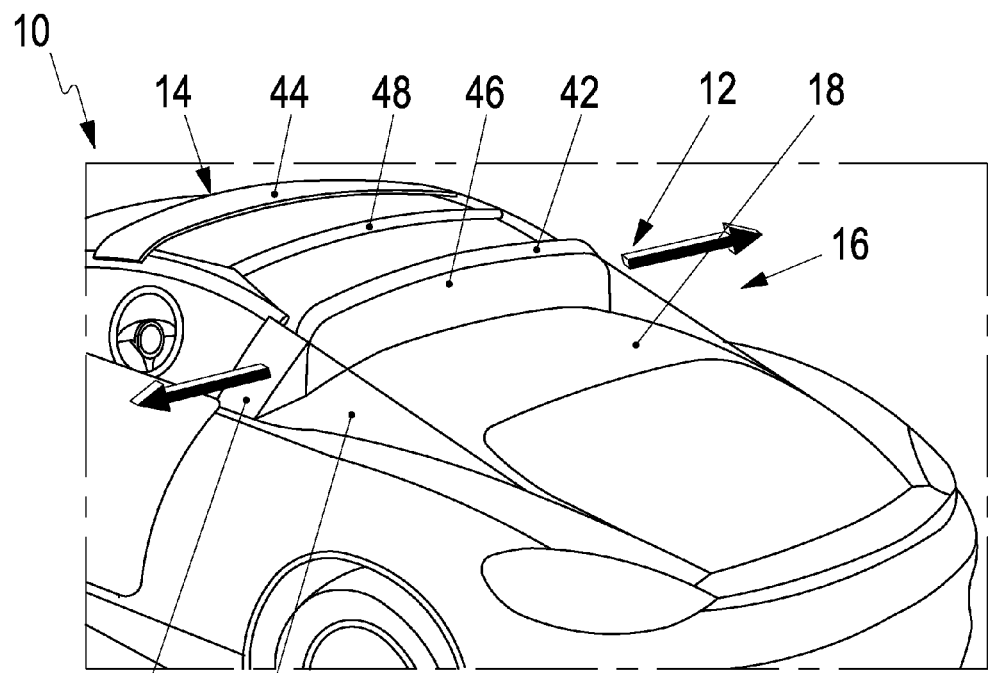
FIG. 8 is a schematic perspective view of the motor vehicle of FIG. 1 in a second position.
Figure 9:
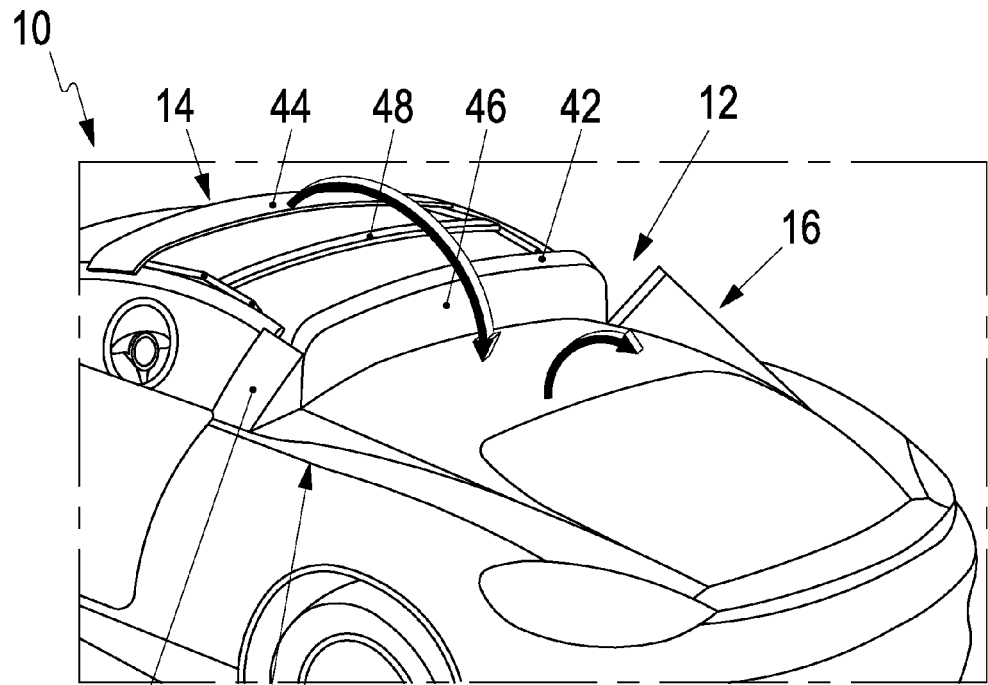
FIG. 9 is a schematic perspective view of the motor vehicle of FIG. 1 in a third position.
Figure 10:
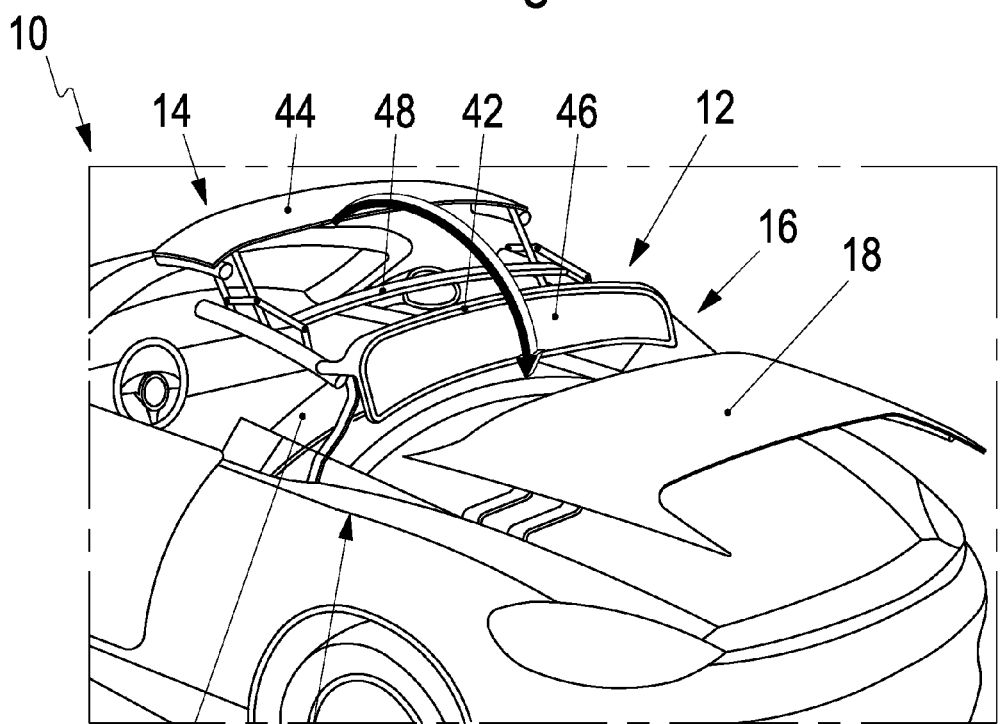
FIG. 10 is a schematic perspective view of the motor vehicle of FIG. 1 in a fourth position.
Figure 11:
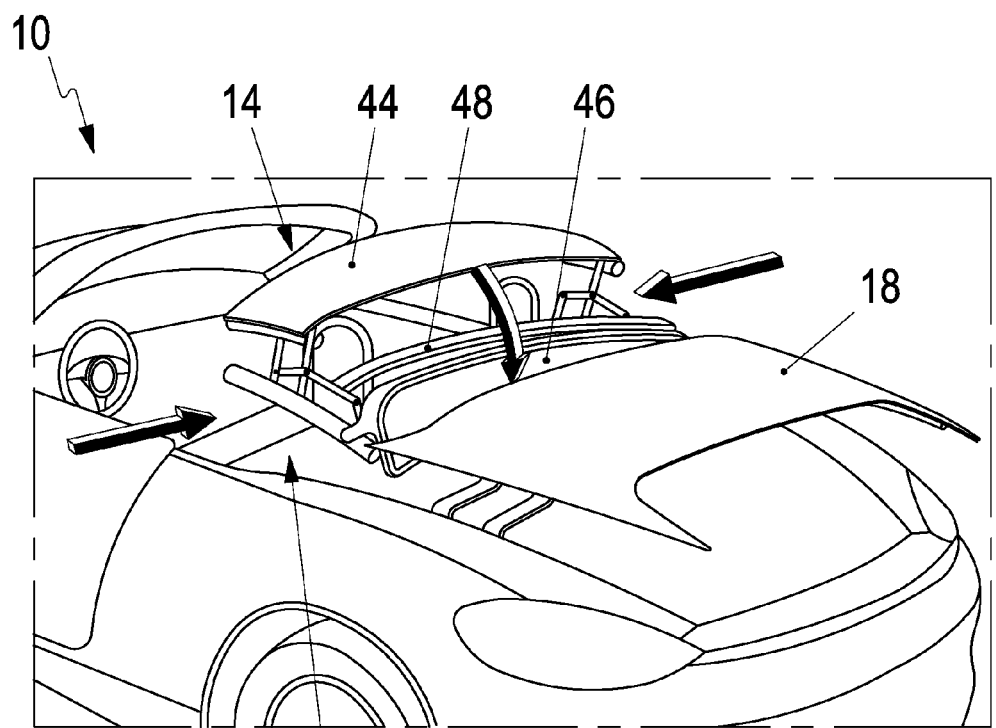
FIG. 11 is a schematic perspective view of the motor vehicle of FIG. 1 in a fifth position.
Figure 12:
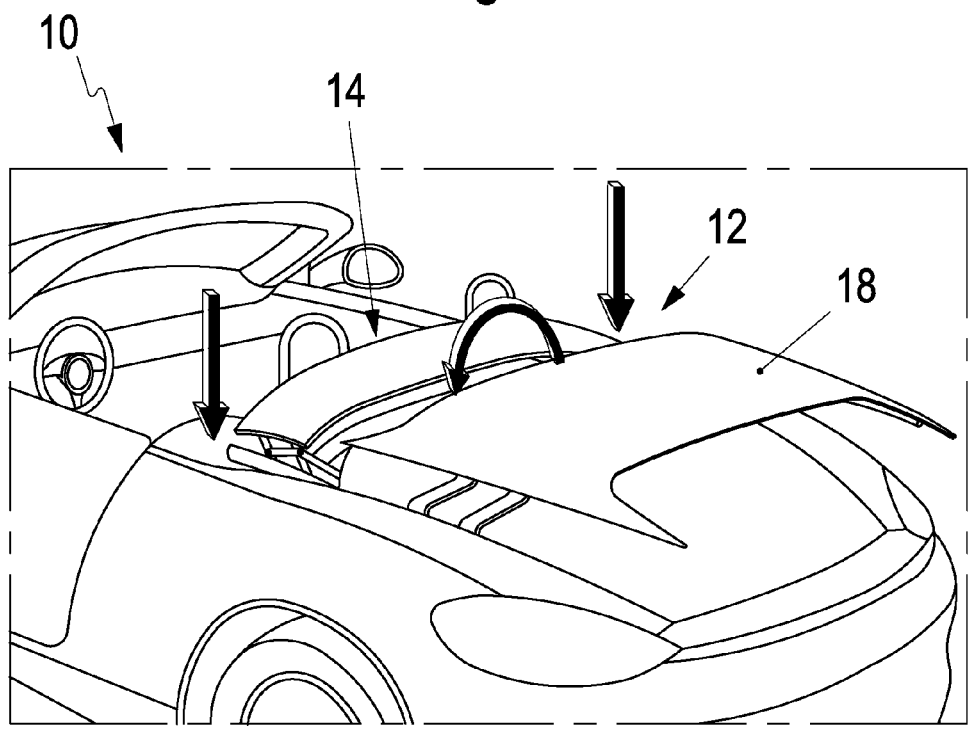
FIG. 12 is a schematic perspective view of the motor vehicle of FIG. 1 in a sixth position.
Figure 13:
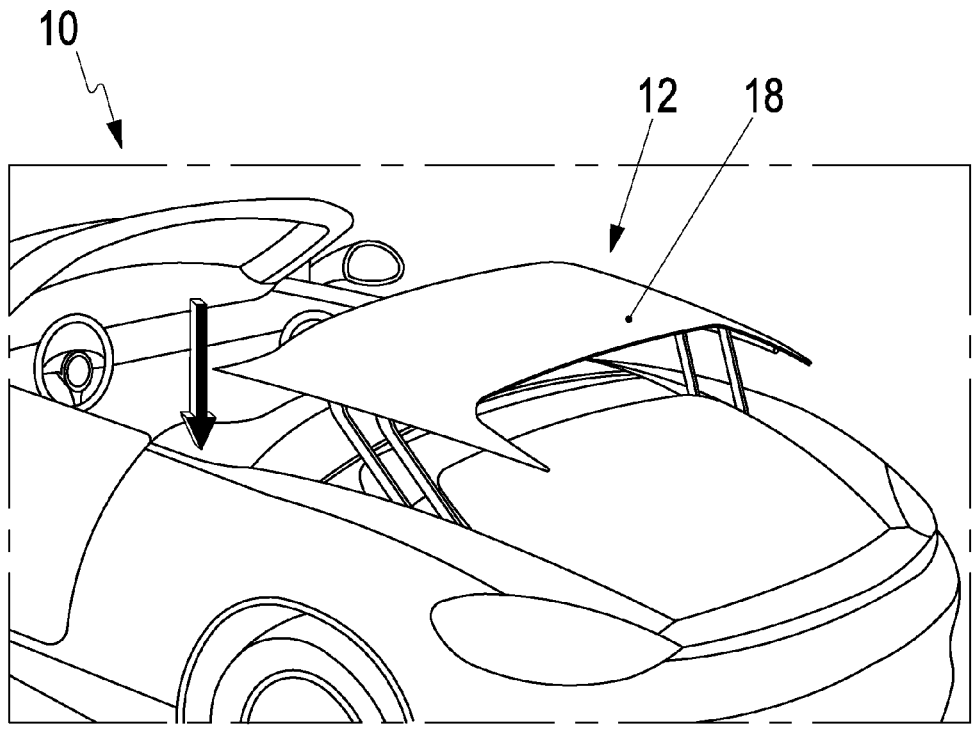
FIG. 13 is a schematic perspective view of the motor vehicle of FIG. 1 in a seventh position.
Figure 14:
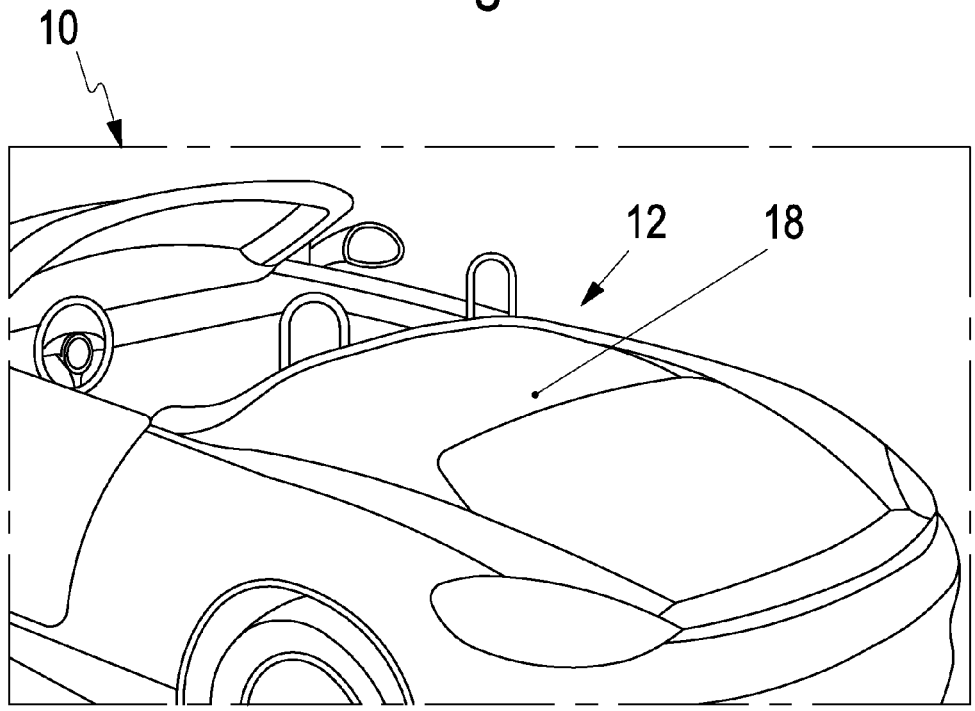
FIG. 14 is a schematic perspective view of the motor vehicle of FIG. 1 in an eighth position.

As illustrated in FIG. 6, the side fins 16 can be coupled in terms of movement to one another and to the folding top 14 by way of a corner hoop 42 of the folding top 14. Thus, swiveling movement of the side fins 16 can be adapted automatically to the movement of the folding top 14 between the deployed position and the retracted position. For example, in the initial position illustrated in FIG. 7, the folding top 14 is closed, wherein, for a clear illustration, the folding-top material of the folding top 14 and the flexible material of the left-hand side fin 16 have been omitted. The folding top 14 can be retracted from the deployed position of FIG. 7 by initially pivoting the side fins 16 outward, as illustrated in FIG. 8. This is performed by a link that is mounted rotatably on the corner hoop 42 and that engages on the link lever 34 of the respective side fin 16. The folding-top compartment lid 18 has the free space needed to move from the closed position to the open position when the side fins 16 have reached their pivoted-away position of FIG. 9. The movement of the folding top 14 into the retracted position, with simultaneous collapsing of the folding top 14, may be initiated virtually at the same time as the opening of the folding-top compartment lid 18. FIG. 10 illustrates the folding-top compartment lid 18 that has been fully opened. By way of coupling links, a front roof frame 44 of the folding top 14 and a rear-window roof frame 46 of the folding top 14 are set down on a middle roof frame 48 of the folding top 14 so that the folding top 14 can be collapsed. A three-dimensional movement is achieved by further coupling links so that the folding top 14 pivots together with the support pillars 22 into the folding-top compartment 20, as illustrated in FIG. 11. In this case, the side fins 16 again are swiveled back slightly into a substantially vertical position so that the collapsed folding top 14 can be retracted into the folding-top compartment 20 past the side fins 16 in a collision-free manner. Subsequently, the side fins 16 can be lowered substantially vertically into the folding-top compartment 20, as illustrated in FIG. 12 and then the folding top 14 is lowered into the folding-top compartment 20. Thereafter, as illustrated in FIG. 13, the folding-top compartment lid 18 can close the folding-top compartment 20 and cover the folding top 14 and the side fins 16. Furthermore, it is possible here for linkage flaps to be closed, resulting in the closed state illustrated in FIG. 14.

Figure 15:
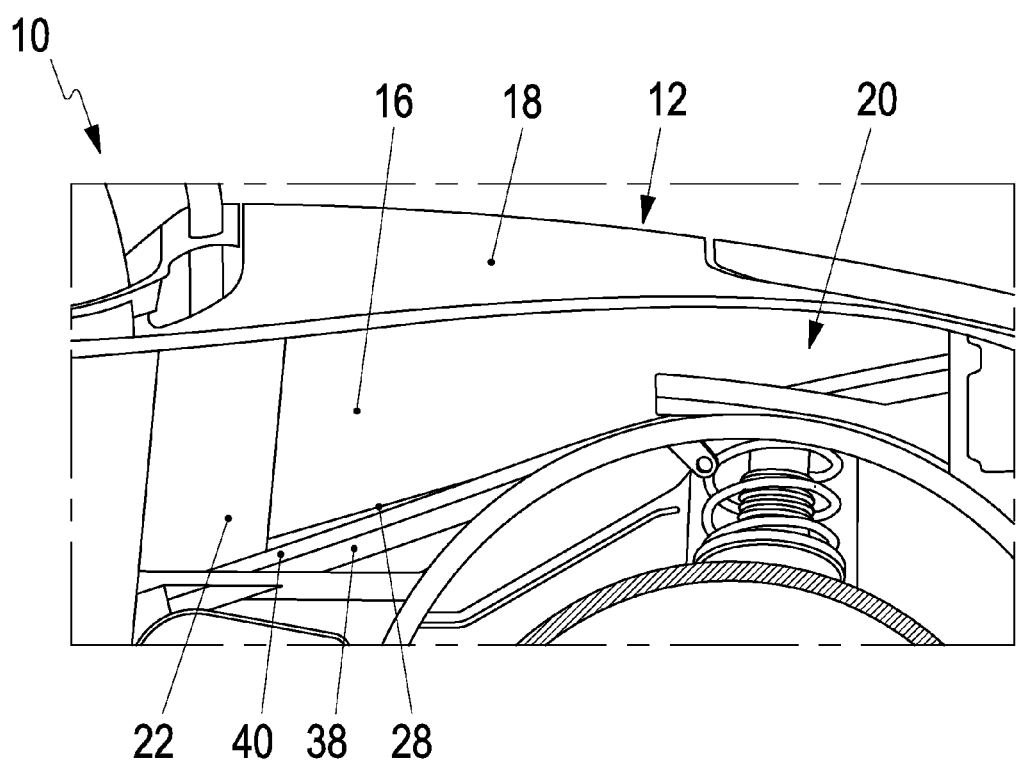
FIG. 15 is a schematic sectional view of the motor vehicle of FIG. 14.

As illustrated in FIG. 15, the folding-top compartment 20 can offer enough structural space that the side fins 14 can be swiveled into the folding-top compartment 20 about a horizontal axis. It is however also possible for the side fins 16 to likewise be collapsed and positioned in the folding-top compartment 20 in the collapsed state.

What is claimed is:

1. A roof system for a cabriolet motor vehicle, comprising:
   a folding top that is movable between deployed and retracted positions;
   a folding-top compartment lid moveable between an open position and a closed position in which the folding-top compartment lid covers the folding top that is in the retracted position; and
   at least one side fin provided on a side of the folding-top compartment lid, the at least one side fin being movable from:
      a use position in which the side fin forms a rearward elongation of a support pillar in the deployed position of the folding top and with folding-top compartment lid in the closed position,
      a pivoted-away position in which the side fin is pivoted outwardly away from the folding-top compartment lid about a pivot axis parallel to a direction of travel of the motor vehicle so that the folding-top compartment lid is moving independently of the at least one side fin between the closed and open positions, and
      a pivoted-in position in which the side fin is moved to a position below the folding-top compartment lid, at least part of the movement of the side fin to the pivoted-in position being a pivoting movement about the pivot axis.

2. The roof system of claim 1, wherein the side fin that is in the pivoted-in position is vertically above the folding top that is in the retracted position.

3. The roof system of claim 1, wherein the side fin that is in the pivoted-in position is laterally adjacent to the folding top that is in the retracted position.

4. The roof system of claim 1, wherein the side fin is swiveled through an angle $\alpha$ between the use position and the pivoted-in position, wherein $\alpha=0°\pm90°$.

5. The roof system of claim 1, wherein the side fin that is in the use position projects transverse to a direction of travel and is laterally adjacent to the folding-top compartment lid.

6. The roof system of claim 5, further comprising a folding-top compartment that receives the folding top in the retracted position and the side fin in the pivoted-in position and that can be closed by the folding-top compartment lid.

7. The roof system of claim 6, wherein at least a part of the side fin is outside the folding-top compartment in the use position.

8. The roof system of claim 1, wherein the pivot axis of the side fin runs through a flexible material of the side fin.

9. The roof system of claim 8, wherein the flexible material is tensioned between a bracket arranged below the closed folding-top compartment lid and a reinforcement strut that runs on an upper edge of the side fin.

10. The roof system of claim 1, wherein a front end of the side fin is connected to a link lever that is coupled in terms of movement to the folding top and that is configured for the swiveling the side fin.

11. The roof system of claim 1, wherein at least an element of the support pillar is connected to the side fin and swivels together with the side fin.

12. The roof system of claim 11, wherein the support pillar is covered at least partially by the side fin.

13. The roof system of claim 1, wherein the side fin is collapsed in the pivoted-in position.

14. The roof system of claim 1, wherein the side fin, in the use position, partially covers the folding-top compartment lid.

15. The roof system of claim 1, wherein an outflow opening is between the side fin and the folding-top compartment lid for discharging rainwater.

* * * * *